C. FAHLBERG.
CHEMISTS' TEST APPARATUS.
No. 169,348. Patented Nov. 2, 1875.
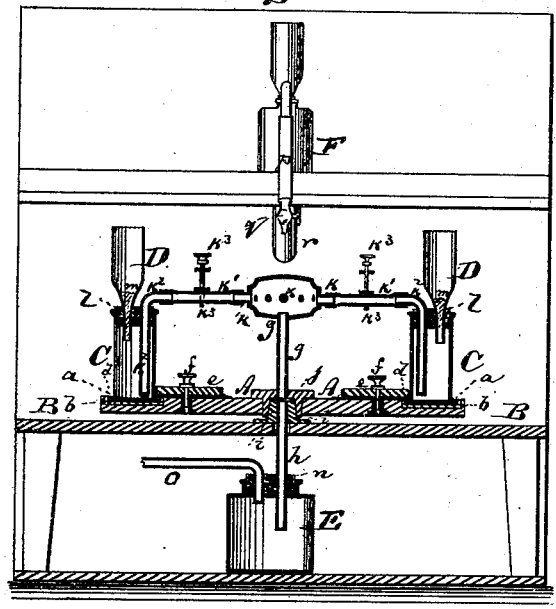
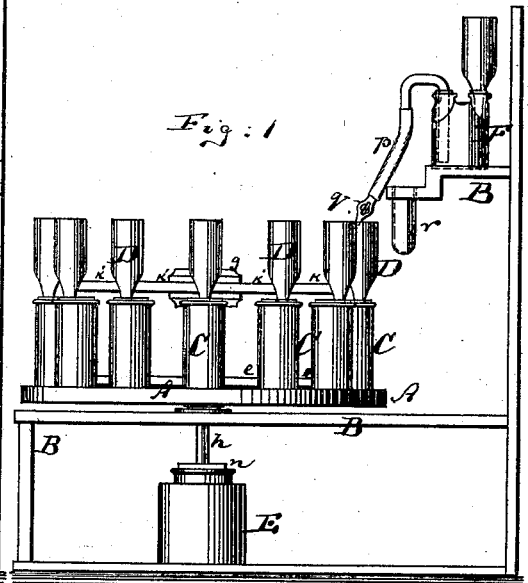
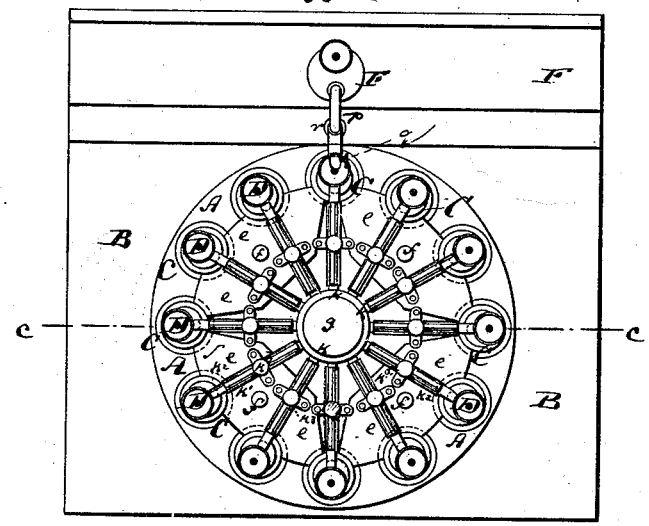
Witnesses:
A. Moraga.
H. v. Briesen
Inventor
C. Fahlberg
by his attorney
A. v. Briesen

UNITED STATES PATENT OFFICE.

CONSTANTIN FAHLBERG, OF NEW YORK, N. Y.

IMPROVEMENT IN CHEMISTS' TEST APPARATUS.

Specification forming part of Letters Patent No. 169,348, dated November 2, 1875; application filed April 7, 1875.

*To all whom it may concern:*

Be it known that I, CONSTANTIN FAHLBERG, of the city, county, and State of New York, have invented a new and Improved Chemist's Test Apparatus, for sugar, molasses, and other substances, of which the following is a specification:

Figure 1 is a side view of my improved test apparatus. Fig. 2 is a plan or top view of the same; and Fig. 3, a vertical central section thereof on the line $c$ $c$, Fig. 2.

Similar letters of reference indicate corresponding parts in all the figures.

This invention relates to a new apparatus to be used by chemists in testing the condition of raw sugar, molasses, or other substances, being a multiple refining and filtering apparatus on a small scale.

The object of the invention is to permit the rapid and thorough simultaneous filtering or refining of a series of samples, and to dispense with the necessity of either testing each sample of a series in a separate apparatus, which would require a large number of costly test apparatus, or of losing time in waiting with all samples till one has been tested, and then testing them all successively.

My invention consists, principally, in the construction of a turn-table which carries a series of test-bottles, all of them being united to a single stationary central receptacle and affected by a single air-pump, so that, by the operation of the latter, the liquid contents of all the test-bottles will be simultaneously withdrawn, as hereinafter more fully described. The invention also consists in further details of the construction and arrangement of parts, as hereinafter more fully described.

The letter A in the drawing represents a horizontal disk or turn-table, supported on a stationary frame, B, so it can freely revolve thereon. In the upper face of the turn-table are formed a series of depressions, $a$ $a$, of preferably circular form, all disposed, by preference, equidistant from each other, and equidistant, also, from the center of the turn-table. A cushion, $b$, should be placed in each cavity $a$. C C C are a series of test-bottles. Each has an outwardly-projecting rib or flange, $d$, at the bottom, of a size to fit and fill the cavity $a$. These test-bottles are placed on the turn-table, in the cavities $a$ $a$ thereof, and are locked in place by plates $e$ $e$, that are hinged or pivoted to the turn-table, and overlap, when swung in place, part of the flange $d$ of each test-bottle. Each hinged or pivoted plate $e$ may be fastened down by a thumb-screw, $f$. Thus applied, the test-bottles are firmly secured to the turn-table and sustained in a vertical position, and are then not liable to be tilted or overthrown during the rotation of the turn-table and during the filtering process. $g$ is a vertical tube extending upward from the center of the turn-table, and communicating at its lower end with a downwardly-projecting tube, $h$, which is affixed to the frame B. The upper end of the tube $h$ terminates in a stationary hollow truncated cone, $i$. A hollow cap, $j$, formed in the center of the bottom of the turn-table, and constituting the lower termination of the tube $g$, bears upon and embraces the cone $i$, and forms the support and swivel of the turn-table. Owing to the conical form of the fixed cone $i$, a tight joint is produced between the tubes $g$ and $h$. The upper end of the tube $g$ connects with a series of radial tubes, $k$ $k$, as many as there are cavities $a$. Each radial tube $k$ is, by an elastic or other pipe, $k^1$, jointed to a pipe, $k^2$, that passes through the stopple $l$ of one of the test-bottles C down into said bottle, reaching near to the bottom of the same. Each elastic pipe $k^1$ carries a screw-clasp, $k^3$, which constitutes a cock for closing and opening the elastic pipe. Instead of these screw-clasps, cocks in the pipes $k$ or $k^2$ may be employed. Into the stopple $l$ of each test-bottle is also inserted the lower end of a filtering vessel or funnel, D, which, at its lower part, is of inverted conical form. This funnel contains in its contracted lower part a stopple, $m$, of asbestus or other filtering substance. I have found that an asbestus stopple is a superior filter for the laboratory and other purposes. The lower end of the fixed tube $h$ enters through the stopple $n$ of a larger stationary receptacle, E, but does not extend far below said stopple. Another tube, $o$, extends also through said stopple $n$, but not far into the receptacle E. The outer end of the tube $o$ connects with a suitable air-pump.

The operation is as follows: A sample of raw sugar or other substance to be tested is placed into one of the funnels D, over the asbestus stopple $m$, and said funnel D is then put into the stopple of one of the test-bottles C, said test-bottle being secured to the turn-table A by means of a plate, $e$, or by an equivalent catch engaging over its flange $d$. The air-pump, being now put in operation, draws the air through the tube $o$, vessel E, tubes $h\ g\ k\ k^1\ k^2$, bottle C, and filter $m$. It thereby hastens the filtering operation, drawing also the filtered liquid which accumulates at the bottom of the test-bottle, and into which the tube $k^2$ dips, into $k^2\ k^1\ k\ g\ h$ and vessel E. The experimenter can, through the sides of the bottle C, observe the entire operation; but from E the filtered liquid is not withdrawn by the air-pump, as the tube $o$ does not dip into the liquid. While the first sample is being thus filtered the turn-table is slightly turned, and another test-bottle, carrying a filtering-funnel, D, with another sample, is fastened in place, and at once affected by the air-pump, &c., until all the various specimens of sugar or other substance to be tested are represented in the various filtering-vessels on the same turn-table. The time during which each specimen is to be subjected to the action of the air-pump can be well regulated and readily controlled by means of the clasps $k^3$ or equivalent cocks. The filtered liquid from all the test-bottles is collected in the vessel E. The result of each separate test is ascertained by observing the quantity and kind of residue in each filtering-vessel D.

It will be readily observed that by this apparatus chemists will be enabled to ascertain with rapidity, and correctly, the grade and quality of each of a series of samples. Time is gained by the use of the turn-table and the connection with the air-pump, and many separate devices are dispensed with by connecting a large series of filters with the same collecting-vessel E and with the same air-pump.

When it is necessary to supply some precipitant or other chemical to the mass to be filtered or refined, I may mount upon the frame B a vessel, F, containing such chemical, and provide said vessel F with an elastic discharge-tube, $p$, having a cock, $q$, wherewith it can be closed, and a nozzle at its end. This tube $p$ may be inserted into the several funnels D D successively as the same pass by the vessel F during the rotation of the turn-table, to supply the same with the necessary quantity of the chemical. $r$ is the drip-cup for the pipe $p$. This apparatus E $p\ r$ may be multiplied, if desired.

It will be understood that the turn-table may remain stationary during nearly the entire filtering or refining process, as it is only made to turn in order to bring the various test-bottles within convenient reach of the chemist, without affecting the operation, and without requiring the observer to leave his place.

When it is desired to not withdraw the liquid from the test-bottles the tubes $k^2$ are terminated close beneath the stopples of the test-bottles.

I claim as my invention—

1. In a test apparatus for filtering or refining sugar or other substances, the combination of the table A, carrying a series of test-bottles, C C, with the stationary receiver E, which connects with all said test-bottles, as set forth.

2. A test apparatus containing a series of test-bottles, C C, each of which carries a separate filtering-funnel, all of said bottles being connected with and operated by a single air-pump, as specified.

3. In combination with the stationary tube $h$, the rotary tube $g$ on the turn-table A, and the radial tubes $k\ k$, extending from the rotary tube $g$, substantially as and for the purpose herein shown and described.

4. The turn-table A, carrying the upwardly-projecting central tube $g$ and the downwardly-extending cap $j$, combined with the stationary hollow cone $i$, and with the tube $h$ projecting therefrom, substantially as specified.

5. The turn-table A, made with a series of cavities, $a\ a$, and locking-plates $e\ e$, for securing a series of test-bottles, C C, substantially as herein shown and described.

The foregoing description of my invention signed by me this 6th day of April, 1875.

CONSTANTIN FAHLBERG.

Witnesses:
E. C. WEBB,
A. MORAGA.